July 7, 1931.  F. E. ALTMAN  1,812,851

PHOTOGRAPHIC OPTICAL SYSTEM

Filed March 18, 1929  2 Sheets-Sheet 1

| Lens No | Radii | T | S | Glass |
|---|---|---|---|---|
| 1 | 30. / 18. | 12 | 2.98 | Boro Silicate Crown. |
| 2 | 25.15 / 83.55 | 4.5 | .04 | Barium Crown. |
| 3 | 64.16 / 146.00 | 4.5 | | Barium Crown. |
| 4 | 146.00 / 37.37 | 1.0 | 9.25 | Dense Flint. |

Inventor
Fred E. Altman,
By M. M. Perkins
Attorney

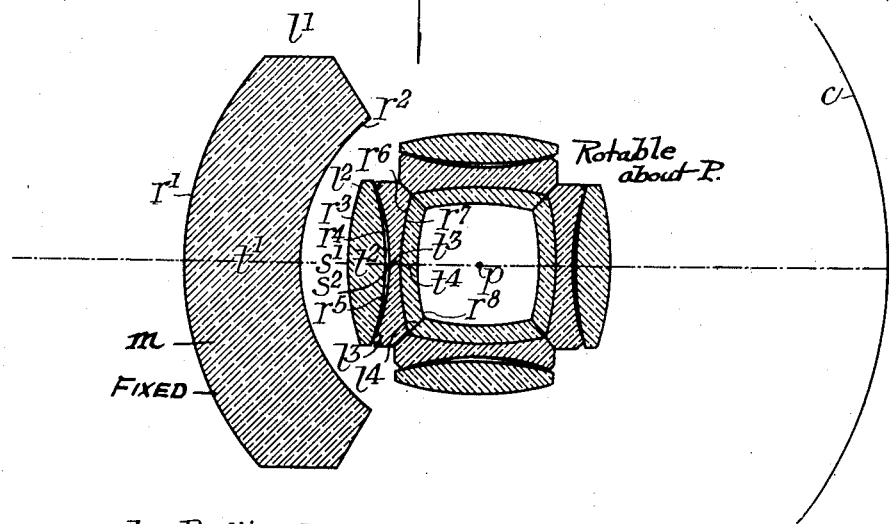

Patented July 7, 1931

1,812,851

UNITED STATES PATENT OFFICE

FRED E. ALTMAN, OF ROCHESTER, NEW YORK, ASSIGNOR, BY MESNE ASSIGNMENTS, TO FELMS REVO CORPORATION, OF NEW YORK, N. Y., A CORPORATION OF NEW YORK

PHOTOGRAPHIC OPTICAL SYSTEM

Application filed March 18, 1929. Serial No. 347,756.

This invention relates to photographic objectives and to optical systems including such objectives.

Among the objects of my invention are the elimination of coma by a new and simple method applicable to present optical systems: the provision of an optical system that can be used for taking panoramic views, particularly in motion picture work; the provision of an objective in which the optical and mechanical centers are coincident; the provision of crossed similar objectives having coincident optical and mechanical centers; and the application of these objectives and systems in panoramic motion picture work.

One of the purposes of this invention is to produce a lens that may be used to panoram a view during each successive exposure in motion picture work. This would require the lens to be rotated with considerable speed during the exposure and because of this speed it would be important to stop the lens and return it to its original position before the following exposure. It is therefore desirable to allow the lens to rotate continuously in one direction at a uniform rate. In making successive exposure as above outlined it would be necessary to form a sharp image by the lens in both the direct anod reversed position as it rotates. Therefore the lens must be exactly symmetrical in construction about its axis of rotation and it must have both Gauss points coincident and situated in this said axis.

It has been found impossible to design a symmetrical type of lens of large aperture that will render sharp definition for distant objects or any objects other than at unit magnification. This is because a mathematical limitation known as the sine condition cannot be satisfied for distant objects in this type of lens. It is necessary that the lens be unsymmetrical in some respects.

To render a lens system unsymmetrical and still be able to meet the condition of rotatability I construct it of two parts, a rotatable symmetrical part and a fixed or stationary part. The latter consists of a negative meniscus element with surfaces concentric with the nodal center, or central point of the axis of rotation of the movable rotatable part. Thus I have an unsymmetrical combination of optical elements bearing the same relations to one another in all positions of the rotatable part. With such a combination it has been found possible to satisfy the sine condition and produce a lens capable of yielding sharp definition at all positions of the rotatable element.

As a further development of this lens system and to simplify the mechanical details of properly exposing each picture and yet be able to take successive pictures at the rate of twenty per second, I have so designed an objective that the central space or separation between each of the two symmetrical components of the symmetrical objective is sufficiently large that another identical system could be mounted at right angles in the same plane and so that the Gauss points of both systems are identical in one and the same point. This makes it possible to rotate the lens at a slower speed giving more exposure to the picture and enabling four pictures to be made with each complete revolution of the symmetrical objective.

The negative meniscus having radii concentric about this point of rotation would have not one optical axis as does an ordinary centered optical element but innumerable axes for since the center of curvature of these two surfaces are coincident innumerable radii could be drawn, all of which would be true optical axes of this concentric meniscus. It is therefore seen that, regardless of the position of the symmetrical system in its rotation in the plane containing its optical center and the optical center of the negative meniscus, the complete lens would constitute a centered system.

Both nodal centers or Gauss points of the negative meniscus with concentric radii are in one and the same point which is their common center of curvature and since this point is made common with the common nodal center of the symmetrical component there is no shift of this nodal center; in other words the common nodal center of the symmetrical component is unaffected by the addition of the concentric element in the manner as above described.

The negative lens may be regarded as performing the function of rendering rays of light from a point at infinity, or parallel rays, divergent as if they came from a finite point near at hand and the symmetrical component as then imaging said rays as it would rays from an actual image at unit magnification and therefore with freedom from coma. This is a logical explanation because the concentric element fulfills perfectly the sine condition and therefore will introduce no coma into the symmetrical system which, acting independently in imaging an object at or near unit magnification, would be free from coma.

In developing the above principles, I have found by careful mathematical analysis that it is possible to design a system as above described that is highly corrected for longitudinal chromatic aberration, lateral chromatic aberration, distortion, spherical aberration and astigmatism. This system also fulfills the sine condition and is therefore free from coma for distant objects.

The above and other objects are attained by the structures which will be more fully described hereinafter, reference being made where necessary, to the accompanying drawings in the several figures on which the same reference characters indicate the same parts, and in which:

Fig. 3 is a diagram showing another and preferred embodiment of my invention.

Coma is an aberration of the oblique rays which in general can be eliminated only in non-symmetrical optical systems. However, it may be absent in a symmetrical system at the particular magnification of unity. That is if the object and the image are at equal distances from the front and rear Gauss points respectively, these distances being twice the focal length of the lens, the object and the image are equal in size and the image is free from coma.

Figure 1:
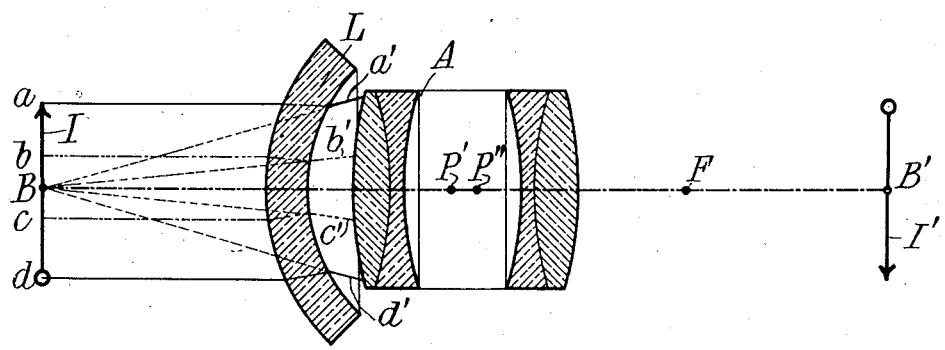
Fig. 1 is a diagram used to explain certain of the optical principles underlying my invention and showing one simple embodiment thereof.

Referring to the diagram of Fig. 1, A is an objective of the symmetrical type having front and rear Gauss points P′ and P″ and a focal length P″F. That is, rays from the left parallel to the axis will be brought to a focus at F. An object I placed at B to the left of the first Gauss point by a distance equal to 2 P″F will be imaged as I′ at B′ at the right of the rear Gauss point by the same distance and at its original size. Coma will be absent from such an image, even though it is present in images at other magnifications.

There may be placed in front of such an objective a negative lens L of such power that rays such as a, b, c, d, proceeding from the left parallel to the axis are refracted to such an extent that, when they reach the objective, they are proceeding along divergent paths a′, b′, c′, d′, which extended to the left pass through B. The effect of the lens L is, as regards the objective, that it moves the object from an infinite distance to the point B. The objective A is therefore functioning at that magnification at which it does not introduce coma. This negative lens is preferably a meniscus, the center of curvature of both surfaces being at P′. Under these conditions, the simple unsymmetrical lens L does not cause coma, and hence this defect is overcome in the system.

Expressed in a different way, the system as a whole, including objective and supplemental lens, is of focal length P″B′, twice the focal length of the objective A, and is unsymmetrical and free of coma.

It is also obvious that the objective can be oscillated about its rear Gauss point, although when the Gauss points are not coincident there would be a slight shift of the image. In spite of this defect this system has use under certain conditions.

Figure 2:
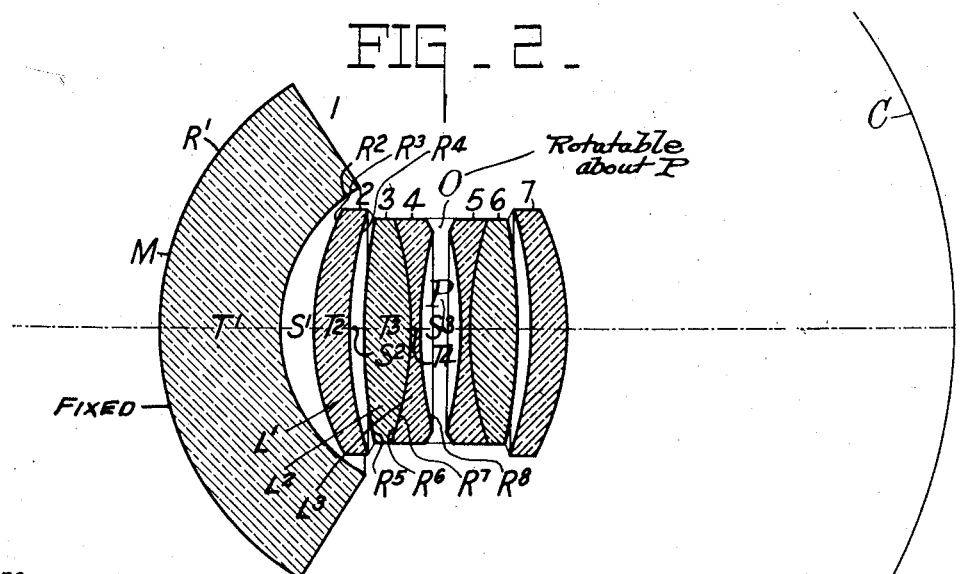
Fig. 2 is a diagram showing another embodiment of my invention.

I will now describe a system in which use is made of this principle for a particular purpose. In Fig. 2, which is diagrammatical, is shown a symmetrical doublet, O, so designed that both its Gauss points are coincident at P, which is also its mechanical center. In front of this objective is mounted a negative meniscus lens M, having concentric surfaces R′ and R″ with their center of curvature at the point P. It is obvious, since the doublet is symmetrical, that it can be turned end for end without affecting the system. The lens M is of considerable diameter and if the doublet alone is turned about the point P, the meniscus lens will continue to function, but the effective axis of the system will swing with the objective, and the focal field of the system swings about the curved locus C.

If the doublet rotates about P, its field will sweep repeatedly across this locus. If at this locus is placed a curved exposure field such as a motion picture gate past which a film is intermittently moved, a series of panoramic motion picture images will be impressed on a film at such a gate.

The amount of correction of coma found to be satisfactory for high grade motion picture work may be attained if the negative lens is only powerful enough to cause the focal length of the system to be of the order of fifty per cent greater than that of the objective alone. This for other practical reasons is also desirable. If the doublet alone has, say, an aperture of F/2 at its normal focal length; the aperture of the whole system would be F/4, if the focal length is twice as great. The greater the power of the negative lens, the less will be the aperture of the system. Moreover, the making of the surface of the negative lens concentric requires that this lens be very thick in order to be of the power required. For this reason I make the negative lens as weak as the quality of the image will permit. It may of course be omitted entirely for work of comparatively low quality in which coma is ignored, but where the ability to rotate the objective is desirable.

The data of the system disclosed in Fig. 2 is as follows:

| Lens | Focal length | Radii | Thickness and separation | Glass D line | ν |
|---|---|---|---|---|---|
| M | −130.7 | $R^1$=30.0 | $T^1$=12 | 1.5150 | 64.5 |
|   |        | $R^2$=18.0 | $S^1$=2.98 |        |      |
| $L^1$ | +56.0 | $R^3$=25.15 | $T^2$=4.5 | 1.6109 | 57.2 |
|       |       | $R^4$=83.55 | $S^2$=0.4 |        |      |
| $L^2$ | +72.0 | $R^5$=64.16 | $T^3$=4.5 | 1.6109 | 57.2 |
|       |       | $R^6$=146.0 | $T^4$=1.0 | 1.6105 | 38.2 |
| $L^3$ | −47.5 | $R^6$=37.37 | $S^3$=9.25 |        |      |

In the above table, M designates the meniscus lens, and $L^1$ to $L^3$ to successive lenses of a single component, $R^1$ to $R^6$ and $R^8$ designate the succession radii of curvature, $T^1$ to $T^4$ the thicknesses, and $S^1$ to $S^3$, the separations. The index of refraction in the D line and the dispersive ratio are also given. The glasses used are, successively, borosilicate crown, barium crown, barium crown and dense flint. The focal length of the whole system is 81.26 and of the symmetrical doublet alone, 49.95. That is the focal length of the system is 163% of that of the doublet. The focal length of each component of the doublet is 77.25.

The aperture of the doublet considered alone is F/2.0, and of the system as a whole F/3.3. The back focal length of the system is 66.25.

A still further extension and preferred form of the idea is shown in Fig. 3. In this, instead of a single doublet, I have shown two crossed similar, symmetrical doublets, the axes of which are at a right angle, one to the other. These are so designed that the central space of each doublet is sufficient to permit the full aperture of the complementary doublet to be utilized across it. Both Gauss points of both doublets are coincident with the point $p$ which is the mechanical center and the axis of rotation and is also the center of curvature of both surfaces of the fixed negative lens $L^1$. It follows that all four components, each composing the half or one of the two doublets, are equal and symmetrically located with respect to the center. The operation of this system is the same as in Fig. 2, except that four exposures are made with every complete rotation of the doublets. The data of the system are as follows:

| Lens | Focal length | Radii | Thickness and separation | Glass D line | ν |
|---|---|---|---|---|---|
| $l^1$ | −130.7 | $r^1$=30.0 | $t^1$=12.0 | 1.5150 | 64.5 |
|       |        | $r^2$=18.0 | $s^1$=5.29 |        |      |
| $l^2$ | +31.63 | $r^3$=24.29 |           | 1.6109 | 57.2 |
|       |        | $r^4$=58.24 | $t^2$=3.0 |        |      |
| $l^3$ | −26.96 | $r^5$=41.11 | $s^2$=0.16 | 1.5684 | 42.7 |
|       |        | $r^6$=26.0  | $t^3$=1.50 |        |      |
| $l^4$ | +47.36 | $r^7$=458.9 | $t^4$=2.0  | 1.5683 | 57.2 |
|       |        |             | $s^5$=12.10 |        |     |

The same data are given as in the first table, the application of corresponding reference characters being obvious. The focal length of the whole system is 51.21 and of the doublet alone 36.80. The focal length of each component of each doublet is 60.0. The glasses are respectively borosilicate crown, barium crown, light flint and light barium crown.

The same results would not be accomplished by rotating any ordinary objective about its mechanical center or about one of its Gauss points, because then the optical effect would not be the same when the lens is reversed or during different angular positions. The meniscus lens with its centers of curvature at the position defined by me does not affect the position of the Gauss points, but does affect the focal length and corrects for coma.

It is obvious that by making a part rotatable a much smoother and more silent operation is possible than would be afforded by oscillation of the lens. The effect of the negative lens on the system depends of course both upon its power and its position. For mechanical reasons it is desirable to place it as close as possible to the rotating doublet. The curvatures and attendant thickness of the meniscus lens are not at all critical and may be varied within wide limits. It is also possible to vary widely the number of lenses and their shape in the symmetrical doublet and still attain an objective having coincident Gauss points.

It is also to be understood that the doublet alone, used without the negative lens, can be rotated about its center and utilized in the taking of motion pictures under circumstances where coma can be disregarded, such as under bright light conditions where a small aperture is used.

Since the negative meniscus lens is in itself uncorrected there being particularly a certain amount of negative aberration, the doublet is so designed as to compensate for this.

I contemplate as included in my invention all such modifications and equivalents as fall within the terms of the appended claims.

Having thus described my invention, what I claim as new and desire to secure by Letters Patent is:

1. A photographic optical system comprising a symmetrical objective of finite, positive focal length and uncorrected for coma and a negative meniscus lens, concave to the doublet, both surfaces of the meniscus lens being concentric with one of the Gauss points of the objective.

2. A photographic optical system comprising a symmetrical objective of finite, positive focal length and uncorrected for coma and a negative meniscus lens, concave to the doublet, both surfaces of the meniscus lens being concentric with the front Gauss point of the objective, the objective being mounted to turn about its rear Gauss point.

3. An optical system comprising an objective in the form of a doublet, the two Gauss points of which are coincident and a negative meniscus lens concave to the doublet, both surfaces of the meniscus lens having their centers of curvature coincident with the position of the Gauss points.

4. An optical system comprising an objective in the form of a doublet, the two Gauss points of which are coincident and a negative meniscus lens concave to the doublet, both surfaces of the meniscus lens having their centers of curvature coincident with the position of the Gauss points, the objective being mounted to rotate about the coincident Gauss points.

5. An optical system comprising an objective in the form of a symmetrical doublet, the two Gauss points of which are coincident and a negative meniscus lens concave to the doublet, both surfaces of the meniscus lens having their centers of curvature coincident with said Gauss points.

6. An optical system comprising an objective in the form of a symmetrical doublet, the two Gauss points of which are coincident with the mechanical center of the objective and a negative meniscus lens concave to the doublet, both surfaces of the meniscus lens having their centers of curvature coincident with said mechanical center of the doublet.

7. An optical system comprising an objective in the form of a symmetrical doublet, the two Gauss points of which are coincident with the mechanical center of the objective and a negative meniscus lens concave to the doublet, both surfaces of the meniscus lens having their centers of curvature coincident with said mechanical center of the doublet, said doublet being mounted to rotate about said mechanical center.

8. An optical system comprising two similar symmetrical doublets mounted on a common rotatable support with their axes positioned at a right angle one to the other, each doublet having its Gauss points coincident at the axis of rotation of the support, and the axes of the doublets intersecting at the same point, and a fixed negative meniscus lens the centers of curvature of both surfaces of which are also coincident with said Gauss points.

9. A photographic optical system comprising a symmetrical objective of finite, positive focal length and uncorrected for coma and a negative meniscus lens, concave to the doublet, both surfaces of the meniscus lens being concentric with one of the Gauss points of the objective and the doublet being designed to compensate for the errors of the uncorrected meniscus.

10. An optical system comprising an objective in the form of a doublet, the two Gauss points of which are coincident and a negative meniscus lens concave to the doublet, both surfaces of the meniscus lens having their centers of curvature coincident with the position of the Gauss points and the doublet being designed to compensate for the errors of the uncorrected meniscus.

Signed at Rochester, New York, this 9th day of March, 1929.

FRED E. ALTMAN.